United States Patent
Ohmura et al.

(10) Patent No.: US 6,556,458 B2
(45) Date of Patent: Apr. 29, 2003

(54) INVERTER DEVICE WITH IMPROVED CURRENT DETECTOR

(75) Inventors: Naoki Ohmura, Fuji (JP); Kazunobu Nagai, Aichi-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/173,780

(22) Filed: Jun. 19, 2002

(65) Prior Publication Data

US 2002/0191427 A1 Dec. 19, 2002

(30) Foreign Application Priority Data

Jun. 19, 2001 (JP) ........................................ 2001-184876

(51) Int. Cl.[7] .......................... H02M 5/45; H02M 7/68; H02H 7/122
(52) U.S. Cl. ........................... 363/37; 363/56.03; 363/98
(58) Field of Search .......................... 363/34, 37, 56.03, 363/98, 132

(56) References Cited

U.S. PATENT DOCUMENTS

| | | | | | |
|---|---|---|---|---|---|
| 6,154,379 A | * | 11/2000 | Okita | .......................... | 363/40 |
| 6,278,622 B1 | * | 8/2001 | Shimazaki et al. | ........... | 363/37 |
| 6,304,465 B1 | * | 10/2001 | Takita | .......................... | 363/37 |
| 6,317,339 B1 | * | 11/2001 | Shimazaki et al. | ........... | 363/37 |

FOREIGN PATENT DOCUMENTS

| | | |
|---|---|---|
| JP | 02197295 | 8/1990 |
| JP | 09229972 | 9/1997 |

* cited by examiner

*Primary Examiner*—Bao Q. Vu
(74) *Attorney, Agent, or Firm*—Pillsbury Winthrop LLP

(57) ABSTRACT

An inverter device includes a DC power supply, an inversion section connected via a DC power supply line to the DC power supply to be supplied with DC voltage from the DC power supply, thereby delivering AC voltage, a current-detecting resistor connected to the DC power supply line and having both ends, and a current detector detecting current on the basis of voltage developed across both ends of the current-detecting resistor. The current detector includes a voltage-dividing resistor, connected between a level-shift power supply line having a predetermined level-shift voltage and one of the ends of the current-detecting resistor, the voltage-dividing resistor having a voltage-dividing point. The current detector further includes an A/D converter having a pair of reference potential terminals and an input terminal, one of the reference potential terminals being connected to the other end of the current-detecting resistor, the input terminal being connected to the voltage-dividing point of the voltage-dividing resistor.

16 Claims, 8 Drawing Sheets

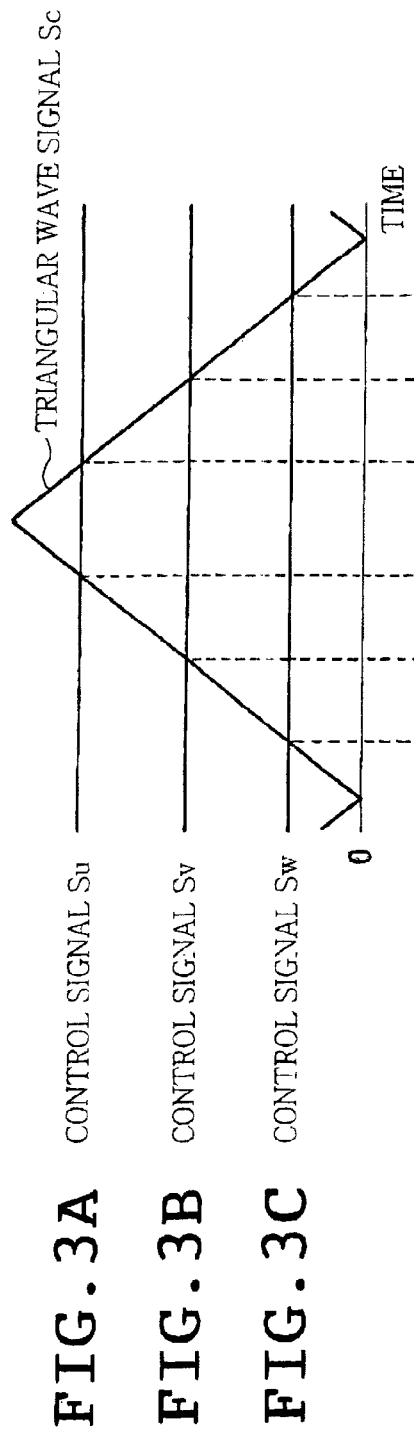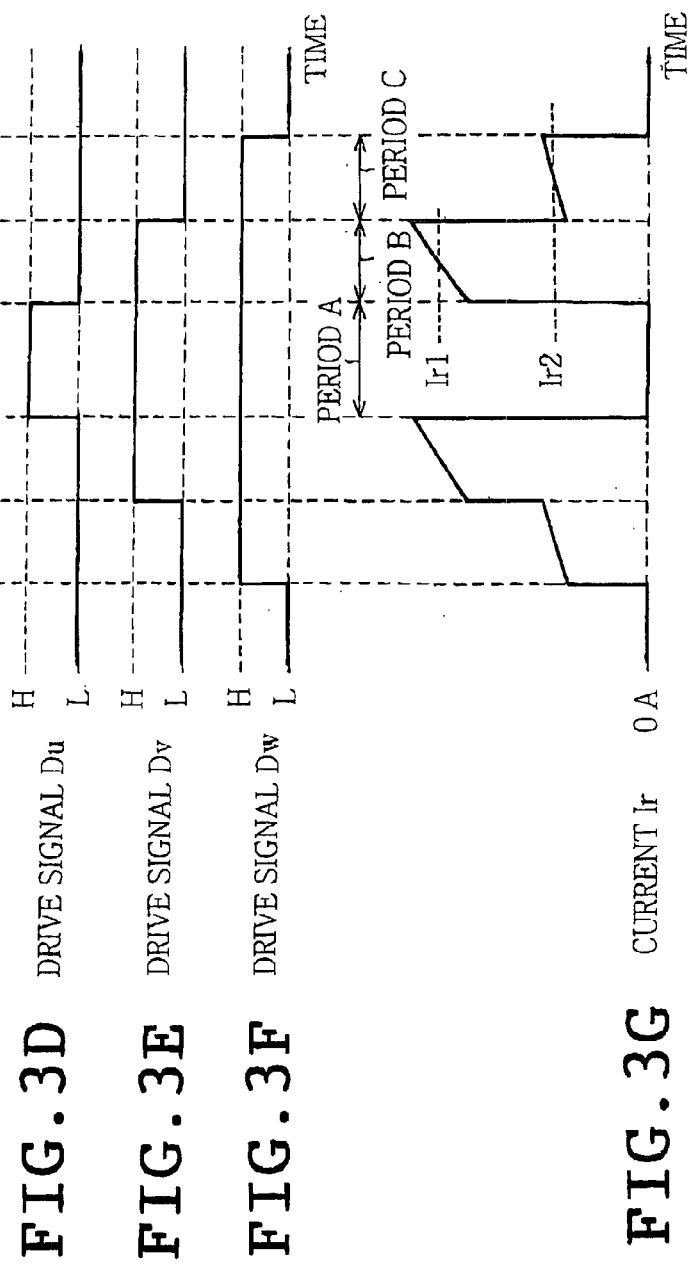

INVERTER DEVICE WITH IMPROVED CURRENT DETECTOR

BACKGROUND OF THE INVENTION

1. Field of the Invention

This invention relates to an inverter device comprising a main circuit which includes a DC power supply, an inversion section and a current-detecting resistor, the inverter device detecting current on the basis of voltage between both ends of the resistor.

2. Description of the Related Art

Motor current needs to be detected precisely for the purpose of feedback control or overcurrent protection control when an inverter device is used to drive an electric motor, for example. Japanese Patent Publication Nos. JP-02197295A and 09229972A disclose current detectors used for the aforementioned purpose respectively. Each disclosed current detector includes a shunt resistor (current-detecting resistor) connected to a DC power supply line between a DC power supply and an inversion section or connected between lower arm side switching elements of the inversion section and the DC power supply line. Voltage developed across both ends of the shunt resistor is amplified by an operational amplifier or isolated amplifier thereafter to be supplied to an AID converter. A processor is provided for obtaining a motor current from a detected current value of the shunt resistor and a PWM drive signal generated by itself.

In the foregoing arrangement, the operational amplifier or isolated amplifier is used as a circuit for processing the voltage across both ends of the shunt resistor. The reason for the use of the amplifier is as follows. The voltage across both ends of the shunt resistor is positive or negative depending upon a direction of current. Accordingly, the voltage cannot directly be supplied to the processor including the A/D converter or A/D conversion function energized from a single power supply. Furthermore, voltage drop is small in the shunt resistor, which is convenient or advantageous when the voltage is amplified so as to be ranged in an input voltage of the A/D converter or processor.

However, using an operational amplifier as the current detector complicates the circuit arrangement and requires both positive and negative power supplies. As a result, a scale and cost of the circuit are increased. Furthermore, the operational amplifier has a delay in operation, which results in a delay in current detection. Consequently, a high-speed and high-precision operational amplifier which is accordingly high in the cost is required in order that a necessary precision in the current detection may be ensured.

SUMMARY OF THE INVENTION

Therefore, an object of the present invention is to provide an inverter device with a current detector which is low-cost without use of an operational amplifier and can detect current with high precision.

The present invention provides an inverter device comprising a DC power supply, an inversion section connected via a DC power supply line to the DC power supply to be supplied with DC voltage from the DC, power supply, thereby delivering AC voltage, a current-detecting resistor connected to the DC power supply line and having both ends, and a current detector detecting current on the basis of voltage developed across said both ends of the current-detecting resistor, the current detector including a voltage-dividing resistor connected between a level-shift power supply line having a predetermined level-shift voltage and one of the ends of the current-detecting resistor, the voltage-dividing resistor having a voltage-dividing point, the current detector further including an A/D converter having a pair of reference potential terminals and an input terminal, one of the reference potential terminals being connected to the other end of the current-detecting resistor, the input terminal being connected to the voltage-dividing point of the voltage-dividing resistor.

Positive or negative current flows into the current-detecting resistor depending upon the state of the DC power supply, inversion section, or a load (an electric motor, for example) connected to the inversion section. When said one reference potential terminal of the A/D converter (said other end of the current-detecting resistor) is at a reference potential, the potential of said one end of the current-detecting resistor changes between positive and negative values in proportion to the aforementioned current. In thee above-described current detector, said one end of the current-detecting resistor is pulled up through the voltage-dividing resistor to the level-shift power supply line. Accordingly, the potential at the voltage-dividing point of the voltage-dividing resistor is shifted in the positive or negative direction depending upon the polarity (positive or negative) of the level-shift voltage. Consequently, positive or negative unipolar voltage in proportion to the aforementioned voltage is applied to the input terminal of the A/D converter.

The foregoing inverter device excludes an operational amplifier and a circuit arrangement accompanying the operational amplifier. Consequently, since the circuit arrangement of the current detector is simplified, a cost reduction can be achieved. Furthermore, since no operational amplifier is used, the inverter device call prevent a delay in the detection timing resulting from a delay in the operation of the operational amplifier. Additionally, the current can precisely be detected when a high-precision current-detecting resistor and a high-precision voltage-dividing resistor are used in the current detector.

BRIEF DESCRIPTION OF THE DRAWINGS

Other objects, features and advantages of the present invention will become clear upon reviewing the following description of the embodiments, made with reference to the accompanying drawings, in which:

FIGS. 3A to 3G are waveform charts showing waveforms at various sections of the inverter device during drive of a brushless motor by sine-wave PWM;

DETAILED DESCRIPTION OF THE INVENTION

Figure 1:
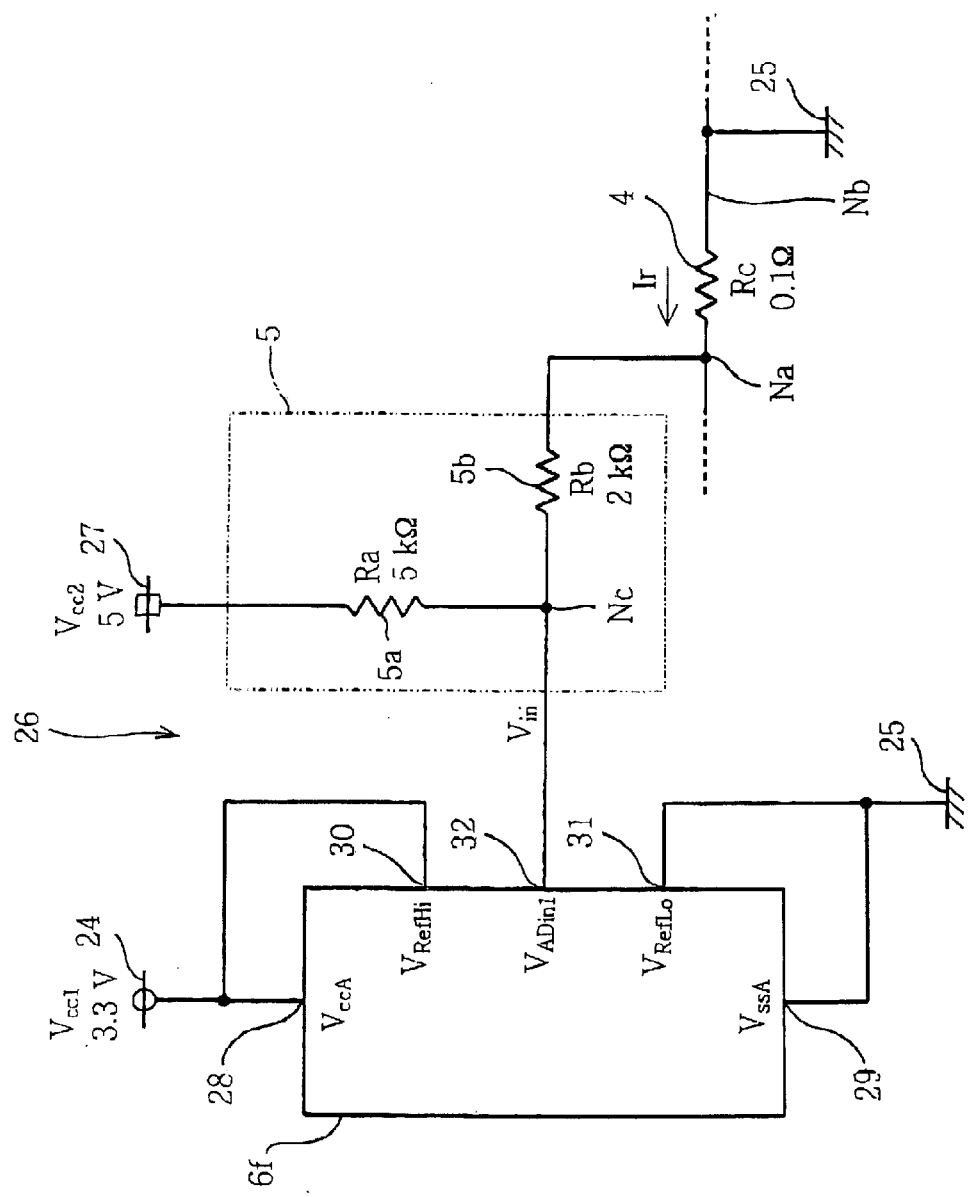
FIG. 1 is an electrical circuit diagram of a current detector or employed in an inverter device of a first embodiment in accordance with the present invention.

Several embodiments of the present invention will be described. Identical or similar parts are labeled by the same reference symbols throughout the embodiments. A first embodiment will be described with reference to FIGS. 1 to 4B. Referring first to FIG. 2, an inverter device 1 embodying the present invention is schematically shown. The inverter device 1 drives a brushless motor, for example. The inverter device 1 comprises a DC power supply 2, an inversion section 3, a current-detecting resistor 4, a level shifter 5, a control circuit 6 and a position signal generator 7.

The DC power supply 2 comprises a diode bridge circuit 9 for rectifying single-phase AC voltage supplied from an AC power supply 8, and a smoothing capacitor 12 connected between DC power supply lines 10 and 11 (power supply lines). The inversion section 3 comprises six N-channel MOS transistors 13 to 18 connected into a three-phase bridge configuration between the power supply lines 10 and 11. A brushless motor 22 has three stator windings 22$u$, 22$v$ and 22$w$ connected to output terminals 19, 20 and 21 of phases U, V and W respectively. Circulating diodes 13$d$ to 18$d$ each having the polarity as shown in FIG. 2 are connected in parallel with the MOS transistors 13 to 18 between drains and sources of the transistors respectively.

The brushless motor 22 includes a position sensor 23 provided for detecting a rotor position and comprising three Hall ICs which are separated from each other by an electrical angle of 120 degrees. The position sensor 23 delivers a position signal which is supplied to the position signal generator 7, which in turn delivers position signals Ha, Hb and Hc each having a phase difference of 120 degrees from the other. The control circuit 6 comprises a processor 6$a$ performing high-speed operation such as a digital signal processor (DSP) and a gate drive circuit 6$b$ driving the transistors 13 to 18. The processor 6$a$ comprises a CPU 6$c$, a rewritable non-volatile memory 6$d$ on which an execution program is stored, a volatile memory 6$e$ on which data is temporarily stored, an A/D converter 6$f$ having a resolution of 10 bit, a PWM circuit 6$g$, an input/output circuit 6$h$, etc. A control power supply circuit (not shown) supplies voltage $V_{cc1}$ (3.3 V) between a control power supply line 24 and a ground line 25. The voltage $V_{cc1}$ serves as power supply voltage for the processor 6$a$.

The inverter device 1 performs a torque control for the brushless motor 22 as well as the PWM control. For this purpose, the inverter device 1 detects currents flowing into stator windings 22$u$, 22$v$ and 22$w$ respectively, which currents are proportional to output torque of the brushless motor 22. These currents will hereinafter be referred to as motor currents $I_u$, $I_v$ and $I_w$. More specifically, a current-detecting resistor 4 is provided on a power supply line 11 between the DC power supply line 2 and the inversion section 3. The inverter device 1 detects the motor currents $I_u$, $I_v$ and $I_w$, based on voltage drop caused in the current detecting resistor 4. In this case, the potential at the power supply line 11 in the DC power supply 2 differs from the potential at the power supply line 11 in the inversion section 3. In the embodiment, the power supply line 11 in the inversion section 3 is connected to the ground line 25, and a potential at a connection therebetween serves as a reference potential.

Figure 2:
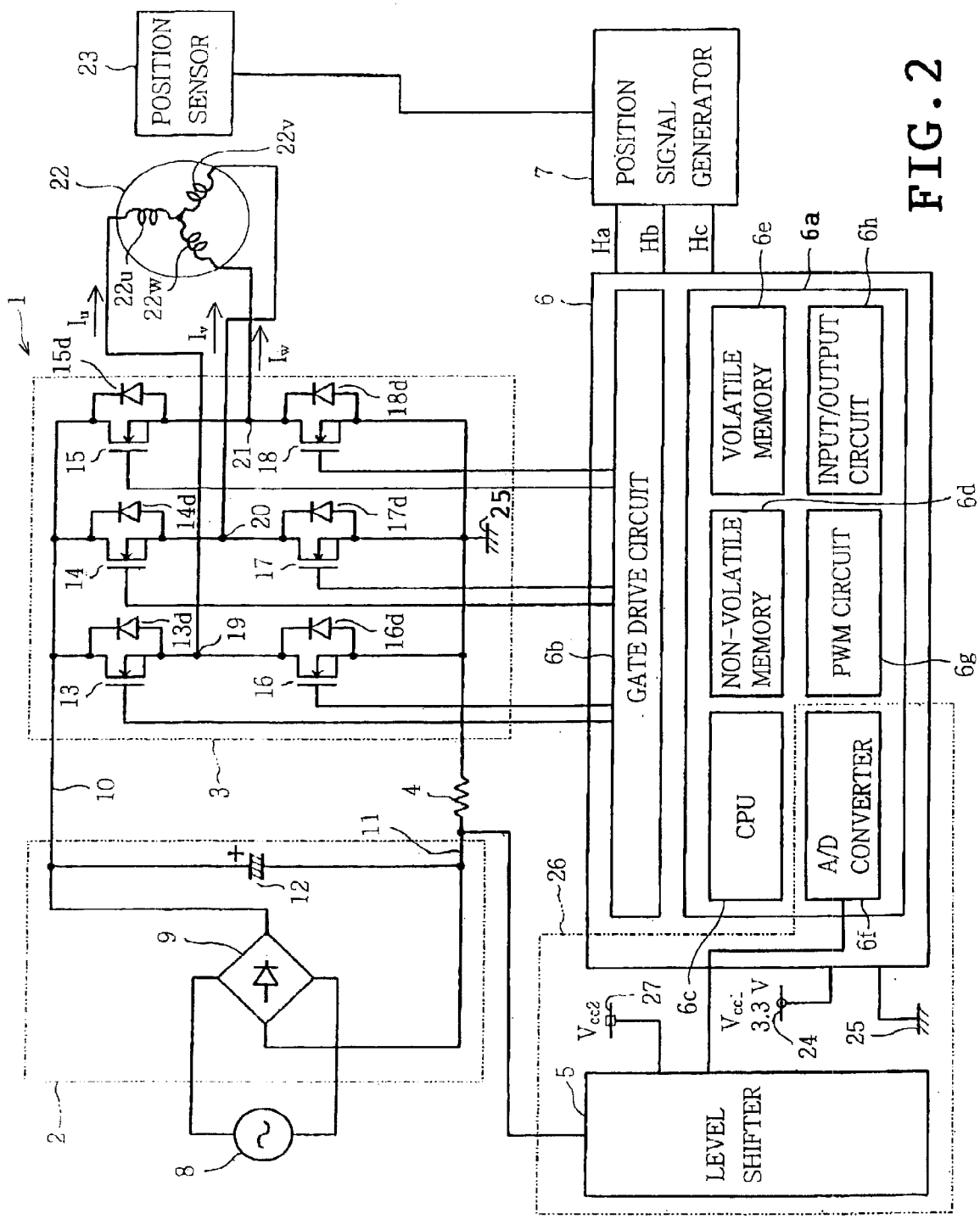
FIG. 2 is a schematic circuit diagram showing the inverter device.

FIG. 1 shows a concrete electrical arrangement of a current detector 26. The current detector 26 includes the level shifter 5 and the A/D converter 6$f$. A control power supply circuit (not shown) supplies level-shift voltage $V_{cc2}$ (5 V) between a control power supply line 27 serving as a level-shift power supply line and the ground line 25. A connection common to the current detecting resistor 4 and the DC power supply section 2 is referred to as "node Na." A connection common to the current detecting resistor 4 and the inversion section 3 is referred to as "node Nb." Then, the level shifter 5 is connected between the control power supply line 27 and the node Na. The level shifter 5 includes a series circuit of resistors 5$a$ and 5$b$ serving as voltage-dividing resistors. The node Nb is connected to the ground line 25 as described above.

The A/D converter 6 incorporated in the processor 6$a$ includes a positive power supply terminal ($V_{ccA}$ terminal) 28, a negative positive power supply terminal ($V_{ssA}$ terminal) 29, a specifying terminal ($V_{RefHi}$ terminal) 30 specifying an upper limit value in a range of converted input voltage, a specifying terminal ($V_{RefLo}$ terminal) 31 specifying a lower limit value in the range of converted input voltage, and an input terminal ($V_{ADin1}$ terminal). The power supply terminals 28 and 29 serve as reference potential terminals. The specifying terminals 30 and 31 serve as upper and lower limit specifying terminals respectively The terminals 28 and 30 are connected to the control power supply line 24, whereas the terminals 29 and 31 are connected to the ground line 25. The input terminal 32 is connected to a node or connection Nc (voltage dividing point) common to the resistors 5$a$ and 5$b$. The A/D converter 6$f$ samples input voltage $V_{in}$ to the input terminal 32 according to a conversion command signal delivered from the CPU 6$c$, thereby starting the A/D conversion.

The operation of the inverter device will now be described with reference to FIGS. 3A to 3G, 4A and 4B. The PWM circuit 6$g$ of the processor 6$a$ supplies a sine-wave PWM signal through the inverter device 1 to the brushless motor 22 so that the motor is driven by the inverter device. Referring to FIGS. 3A to 3G, waveforms are shown at various sections of the inverter device 1 during drive of the brushless motor by means of the sine-wave PWM signal. The PWM circuit 6$g$ includes a plurality of counters (not shown) provided for execution of pulse width modulation. FIGS. 3A to 3C show a triangular wave signal Sc serving as a carrier signal and sinusoidally changing counter values of control signals $S_u$, $S_v$ and $S_w$. The PWM circuit 6$g$ includes a comparator (not shown) comparing the counter values of the signal $S_c$ with the counter values of the control signals $S_u$, $S_v$ and $S_w$ to generate phase U, V and W drive signals $D_u$, $D_v$ and $D_w$. The upper arm side MOS transistors 13 to 15 are turned on when the drive signals $D_u$, $D_v$ and $D_w$ are at the high level. The lower arm side MOS transistors 16 to 18 are turned on when the drive signals $D_u$, $D_v$ and $D_w$ are at the low level.

FIG. 3G shows current Ir flowing from the inverting section 3 through the current detecting resistor 4 into the DC power supply section 2 during power running. The upper arm side MOS transistors 13 to 15 of the respective phases U, V and W are turned on in a period A in FIG. 3G. The current Ir detected by the current detecting resistor 4 is zero since the motor currents $I_u$, $I_v$ and $I_w$ circulate between the inversion section 3 and the respective stator windings 22$u$, 22$v$ and 22$w$. Accordingly, the CPU 6$c$ does not execute the sampling of current Ir nor the A/D conversion in the period A. The foregoing can also be applied to a period in which all the lower arm side MOS transistors 16 to 18 are turned on.

On the other hand, the CPU 6$c$ delivers a conversion command signal to the A/D converter 6$f$ on the basis of the drive signals $D_u$, $D_v$ and $D_w$ in each of periods B and C.

Consequently, the CPU 6c executes the sampling of current Ir nor the A/D conversion, whereby current values Ir1 and Ir2 are obtained as shown in the following. More specifically, the phase U lower arm side MOS transistor 16 and phase V and W upper arm side MOS transistors 14 and 15 are turned on in the period B. Accordingly, the current value Ir1 flowing into the current detecting resistor 4 is shown by the following equation (1):

$$Ir1 = I_v + I_w \quad (1)$$

Furthermore, the phase U and V lower arm side MOS transistors 16 and 17 and phase W upper arm side MOS transistor 15 are turned on in the period C. Accordingly, the current value Ir2 flowing into the current detecting resistor 4 is shown by the following equation (2):

$$Ir2 = I_w \quad (2)$$

Using the current values Ir1 and Ir2 obtained by the A/D conversion, the CPU 6c sequentially obtains the motor current values $I_w$, $I_v$ and $I_u$ from the following equations (3) to (5) respectively:

$$I_w = Ir2 \quad (3)$$

$$I_v = Ir1 - I_w \quad (4)$$

$$I_u = -I_v - I_w \quad (5)$$

The current Ir flowing into the current detecting resister 4 flows from the inversion section 3 (node Nb) toward the DC power supply section 2 (node Na) or in the positive direction during the power running. At this time, the voltage at the node Na is negative on the basis of the voltage at the node Nb. In the current detector 26, the node Na is pulled up via the resistors 5a and 5b to the control power supply line 27. Accordingly, the level of the voltage at the node Na is shifted in the positive direction.

Figure 4A:
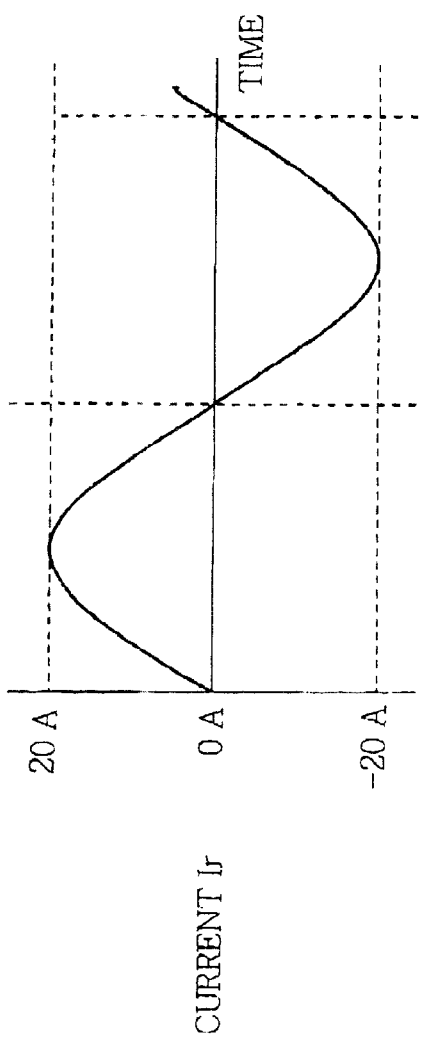
FIGS. 4A and 4B are waveform charts showing the relationship between current Ir and input voltage $V_{in}$ of an A/D converter.
Figure 4B:
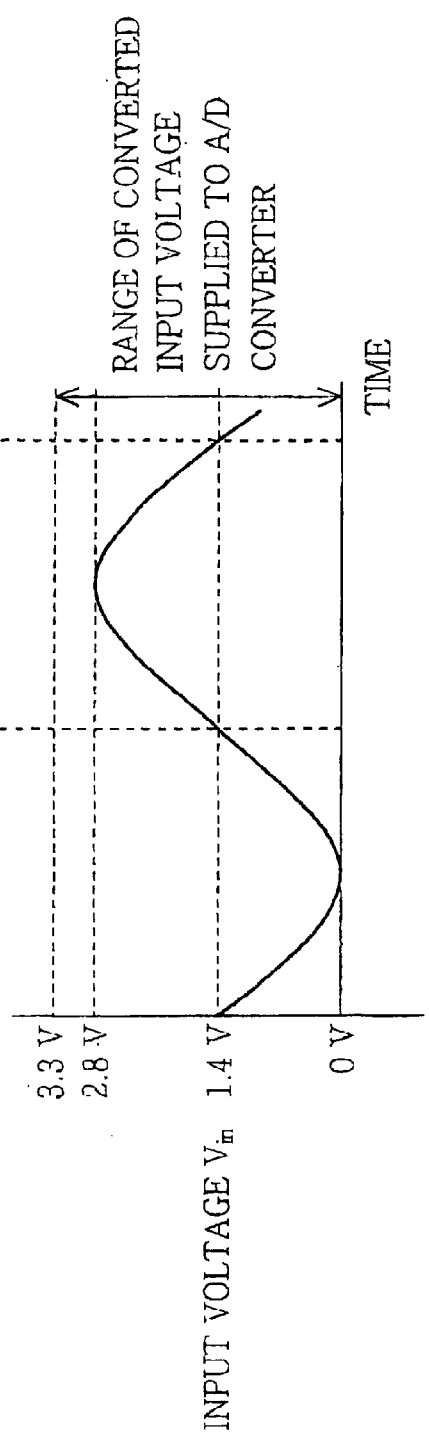

The current flowing into the brushless motor 22 is ±20 A in the embodiment. The resistance value Ra of the resistor 5a is set at 5 kΩ. The resistance value Rb of the resistor 5b is set at 2 kΩ. The current detecting resistor 4 has a resistance value Rc set at 0.1 Ω. Furthermore, voltage $V_{cc1}$ (3.3 V) is applied to the specifying terminal 30 of the A/D converter 6f, whereas voltage $V_{ss}$ (0 V) is applied to the specifying terminal 31. Accordingly, FIGS. 4A and 4B are waveform charts showing the relationship between current Ir and input voltage $V_{in}$ of an A/D converter 6f is from 0 V to 3.3 V. The A/D converter 6f thus converts the input voltage $V_{in}$ ranging from 0 to 3.3 V, at the resolution of 10 bit.

FIGS. 4A and 4B show waveforms of current Ir and input voltage $V_{in}$ of an A/D converter respectively when it is supposed that sinusoidal current Ir having an amplitude of 20 A flows through the current detecting, resistor 4. In this case, voltage drop with the amplitude of 2 V is induced between both ends of the current detecting resistor 4 in proportion to the current Ir. As a result, the input voltage $V_{in}$ is converted to sinusoidal voltage having an amplitude of 1.4 V with the value of 1.4 V as the center. Furthermore, since the current resolution becomes 0.046 A/bit, practically sufficient accuracy can be achieved. However, the margin becomes 0 V between the input voltage $V_{in}$ and the lower limit voltage 0 V of the range of input voltage when the current Ir is +20 A. Accordingly, when more margin is required, the level-shift voltage $V_{cc2}$ needs to be set at a higher value so that the input voltage value $V_{in}$ in the case of zero current Ir becomes about one half of the voltage $V_{cc1}$, that is, about 1.65 V.

As obvious from the foregoing, one terminal (node Na) of the current detecting resistor 4 connected to the power Supply line 11 is pulled up via the resistors 5b and 5a to the control power supply line 27. The other terminal (node Nb) of the resistor 4 is connected to the ground line 25. Consequently, the voltage at the voltage-dividing point of the resistors 5a and 5b is supplied to the A/D converter 6f. Thus, positive unipolar voltage $V_{in}$ in proportion to the current is supplied to the input terminal 32 of the A/D converter 6f. Accordingly, the circuit arrangement of the current detector 26 is simplified since an operational amplifier and an accompanying circuit arrangement are not required. Consequently, the cost of the inverter device can be reduced. Furthermore, since no operational amplifier is used, there is no delay in the detection timing due to delay in operation of the operational amplifier. Furthermore, the current can be detected accurately by employing a high-precision type as the current detecting resistor 4 and resistors 5a and 5b. Additionally, the arrangement that the A/D converter 6f is incorporated in the processor 6a can reduce a lag in the detection timing due to delay in communication and, a decrease in the detection accuracy due to pattern noise as compared with the case where a discrete A/D converter is used.

The specifying terminals 30 and 31 each specifying the range of converted input voltage are connected to the power supply terminals 28 and 29 respectively so that the voltage $V_{cc1}$ (3.3 V) lower than the level-shift voltage $V_{cc2}$ (5 V) is applied to each of the terminals 28 and 29. As a result, since the range of converted input voltage is approximated to the range of input voltage $V_{in}$ (0 to 2.8 V relative to ±20 A), the resolution of the A/D converter can effectively be improved.

Figure 5:
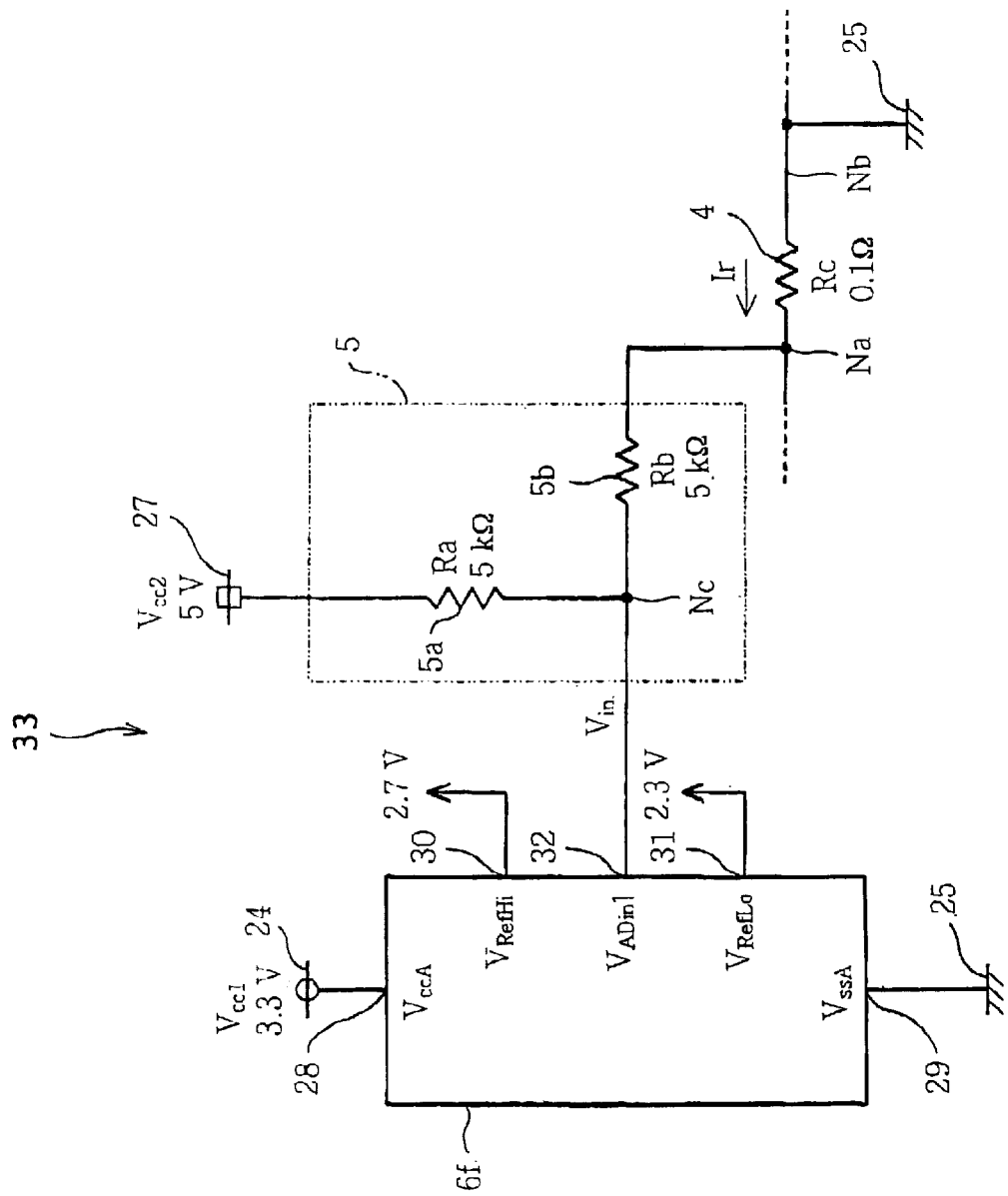
FIG. 5 is a view similar to FIG. 1, showing the current detector employed in the inverter device of a second embodiment in accordance with the invention.
Figure 6A:
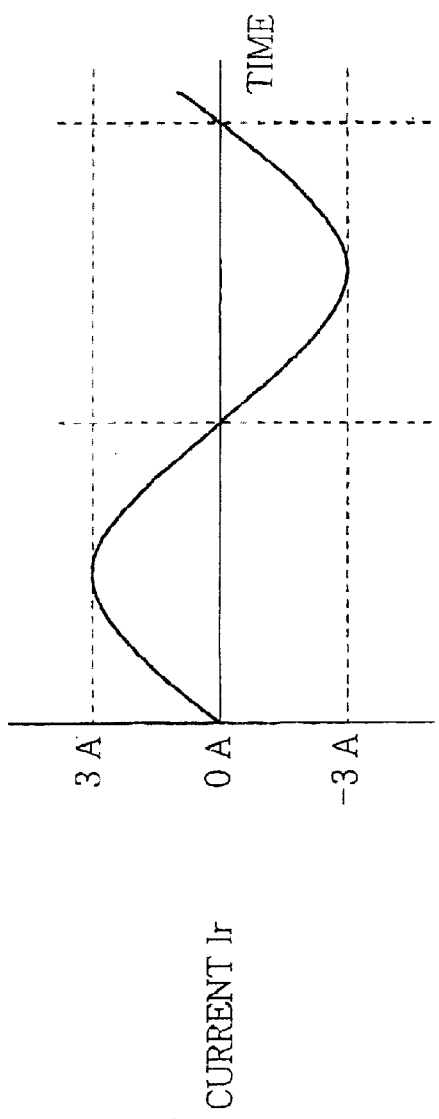
FIGS. 6A and 6B are views similar to FIGS. 4A and 4B in the second embodiment respectively.
Figure 6B:
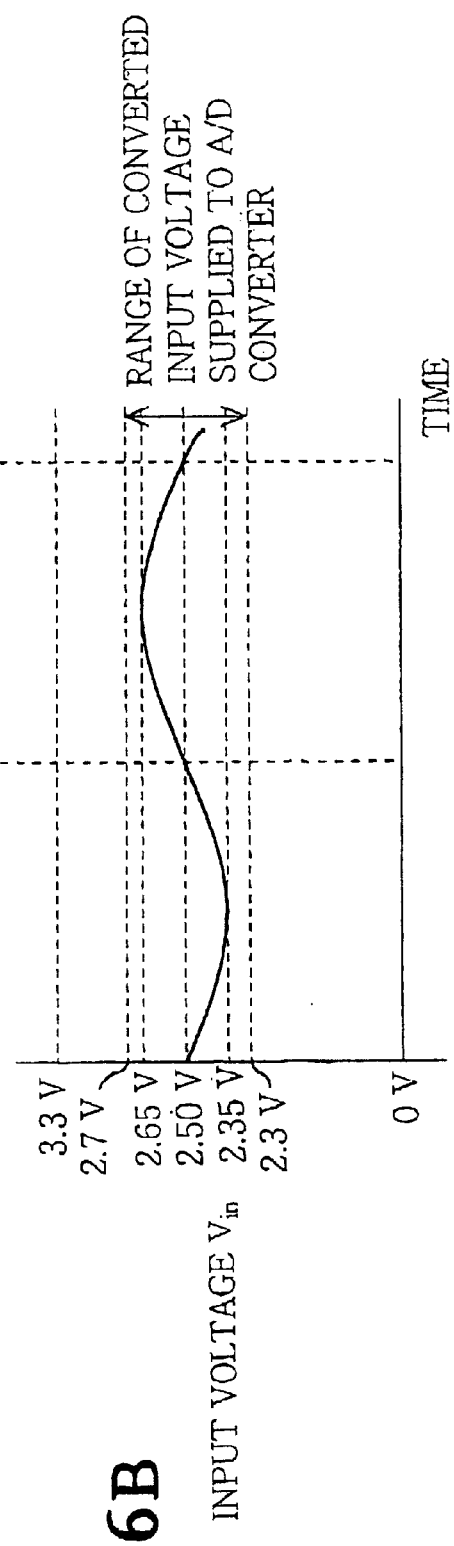

FIGS. 5, 6A and 6B illustrate a second embodiment of the invention. FIG. 5 shows an electrical arrangement of the current detector 33 comprising the level shifter 5 and the A/D converter 6f. The second embodiment differs from the first embodiment in the arrangement of the current detector 33. The current flowing into the brushless motor 22 is at or below ±3 A. The control power supply circuit (not shown) applies the reference voltage of 2.7 V to the reference terminal 30 of the A/D converter 6f as shown in FIG. 5. The control power supply circuit also applies the specifying voltage of 2.3 V to the specifying terminal 31 of the A/D converter 6f. Both resistance values Ra and Rb of the resistors 5a and 5b are set at 5 kΩ.

FIGS. 6A and 6B show waveforms of current Ir and input voltage $V_{in}$ of the A/D converter 6f respectively when it is supposed that sinusoidal current Ir having an amplitude of 3 A flows through the current detecting resistor 4. In this case, voltage drop with the amplitude of 0.3 V is induced between both ends of the current detecting resistor 4 in proportion to the current Ir. As a result, the input voltage $V_{in}$ is converted to sinusoidal voltage having an amplitude of 0.15 V with the value of 2.5 V as the reference value. Since the current Ir is ±3 A or less and accordingly small, the amplitude of the input voltage $V_{in}$ is reduced. However, when the aforesaid specifying voltages are applied to the terminals 30 and 31 of the A/D converter 6f respectively, the range of converted input voltage is narrowed into a voltage range between 2.3 V (lower limit) and 2.7 V (upper limit). Consequently, the current resolution becomes 0.006 A/bit, which value can achieve a practically sufficient precision.

Figure 7:
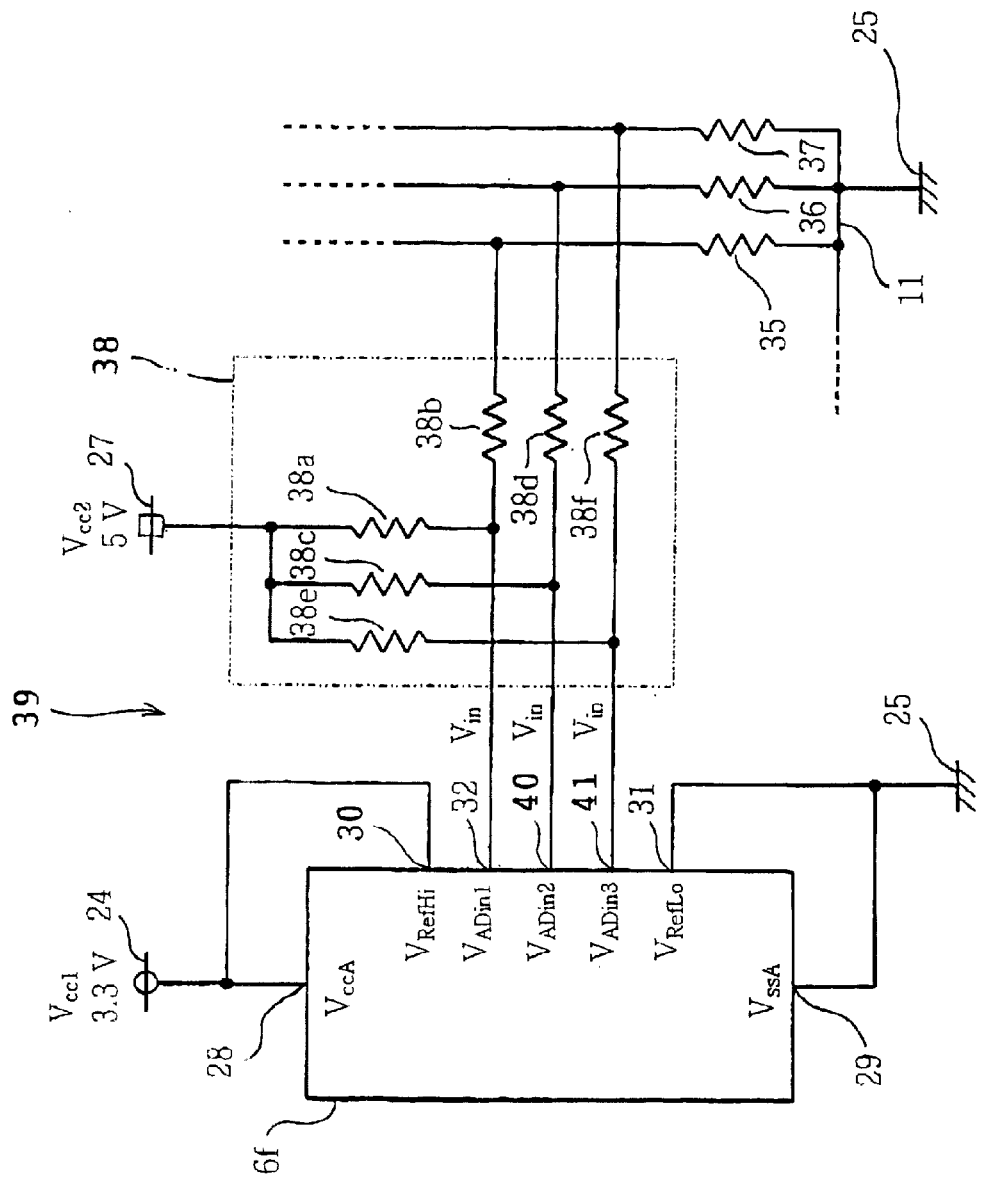
FIG. 7 is a view similar to FIG. 1, showing the current detector employed in the inverter device of a third embodiment in accordance with the invention.
Figure 8:
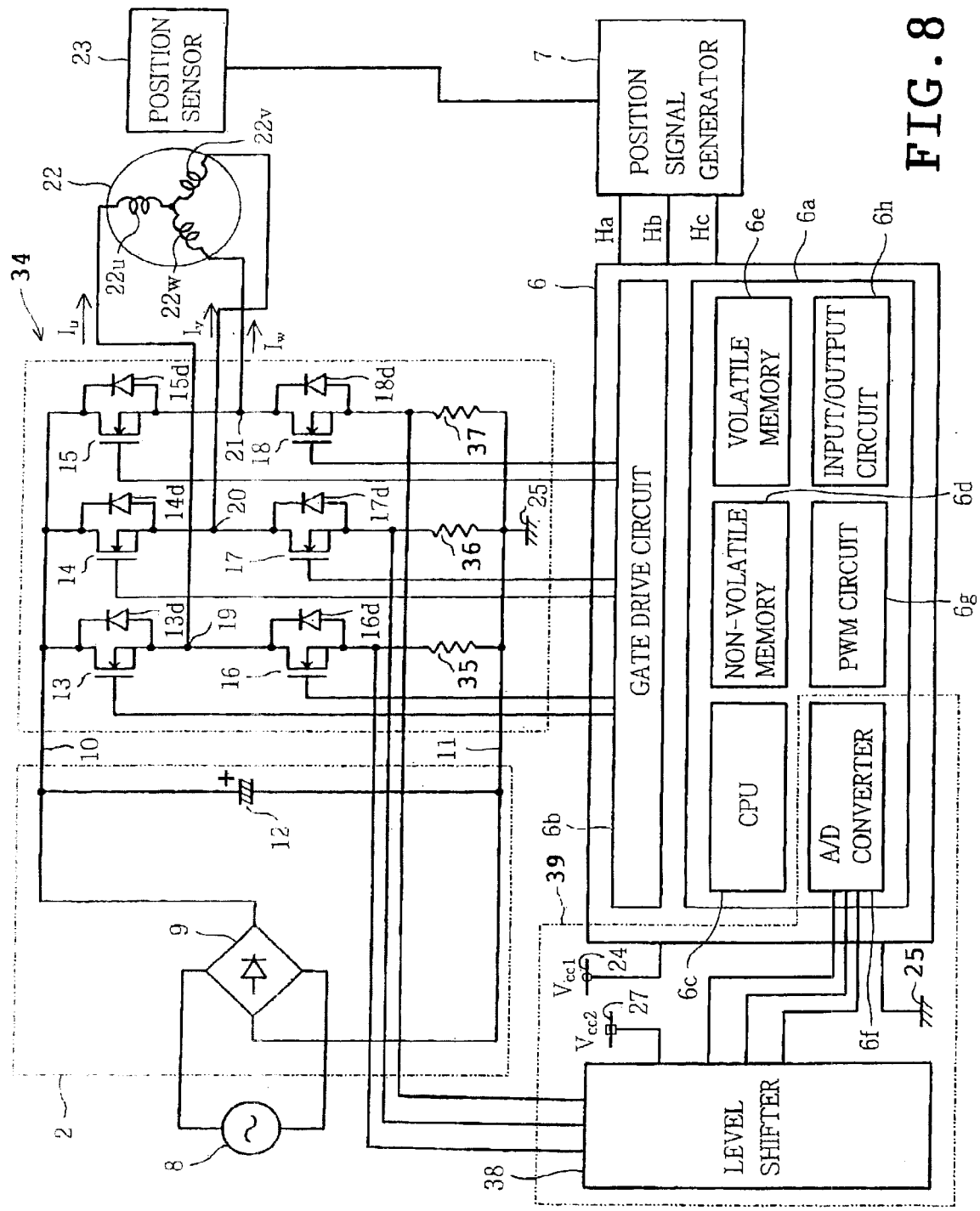
FIG. 8 is a view similar to FIG. 2 in the third embodiment.

FIGS. 7 and 8 illustrate a third embodiment of the invention. Referring to FIG. 8, the power supply line 11 is connected to the ground line 25 in the inverter device 34. The current detecting resistors 35, 36 and 37 are connected between the sources of the MOS transistors 16, 17 and 18 serving as switching elements and the power supply line 11 respectively.

The level shifter 38 constitutes the current detector 39 together with the A/D converter 6f. The level shifter 38 comprises three series circuits of resistors 38a and 38b, 38c and 38d and 38e and 38f, which series circuits pull up one terminals of the respective current detecting resistors 35 to 37 to the control power supply line 27. The series circuits have voltage dividing points connected to the input terminals ($V_{ADin1}$, $V_{ADin2}$ and $V_{ADin3}$) 32, 40 and 41 respectively. The A/D converter 6f is of a multi-channel type and incorporates a single conversion core and a multiplexer. The A/D converter 6f selects one of the channels or input terminals according to a conversion command signal delivered from the CPU 6c to perform the sampling and the A/D conversion Each of the resistors 38a, 38c and 38e has a resistance value Ra set at 5 kΩ, whereas each of the resistors 38b, 38d and 38f has a resistance value Rb set at 2 kΩ. Further, each of the current detecting resistors 35 to 37 has a resistance value Rc set at 0.1 Ω.

The motor currents $I_u$, $I_v$ and $I_w$ flow through the MOS transistors 16, 17 and 18 or circulating diodes 16d, 17d and 18d into the current detecting resistors 35, 36 and 37 while the lower arm side MOS transistors 16, 17 and 18 are in ON-state, respectively. Accordingly, the CPU 6c carries out the current detection with respect to each phase while the lower arm side MOS transistors 16, 17 and 18 are in ON-state. The variation range of the input voltage $V_{in}$ n of the A/D converter 6f in this case is the same as that in the first embodiment. When it is supposed that the directions as shown in FIG. 8 with respect to the motor currents $I_u$, $I_v$ and $I_w$ are positive, detected values of the motor currents $I_u$, $I_v$ and $I_w$ are obtained by inverting signs of digital values obtained by the A/D conversion.

As obvious from the foregoing, the same effect can be achieved from the third embodiment as from the first embodiment. Furthermore, since a current detectable period for each phase is rendered longer in the third embodiment than in the first embodiment, a margin in the current sampling is increased. Consequently, a more reliable current detection can be realized.

Referring now to FIGS. 1, 5 and 7, an optimum manner of setting a constant value will be described regarding the resistance value Ra of the resistor 5a (or 38a, 38c and 38e) and the resistance value Rb of the resistor 5b (or 38b, 38d and 38f) in a fourth embodiment. In the following case, the reference terminal 31 of the A/D converter 6f is connected to the ground line 25 and the specifying voltage $V_{Ref}$ is applied to the reference terminal 30. However, the constant value can be set in the same manner even when the specifying voltage is applied to the specifying terminal 31 or when the specifying voltages are applied to the respective specifying terminals 30 and 31.

Firstly, when positive maximum rated current $I_m$ flows into the brushless motor 22, setting is carried out so that the input voltage $V_{in}$ of the A/D converter 6f becomes 0 V. This setting is carried out in order that application of negative voltage to the input terminals 32, 40 and 41 of the A/D converter 6f may be prevented and that the range of the input voltage $V_{in}$ may be approximated to the range of converted input voltage for improvement in the effective resolution. The following relational expression (6) is obtained from the aforementioned first condition regarding a ratio of the resistance value Ra to the resistance value Rb:

$$Ra:Rb = V_{cc2}:(I_m \cdot Rc) \quad (6)$$

Secondly, when negative maximum rated current $I_m$ flows into the brushless motor 22, setting is carried out so that the input voltage $V_{in}$ of the A/D converter 6f is set at the specifying voltage $V_{Ref}$. This setting is also carried out for improvement in the effective resolution. The following relational expression (7) is obtained from the aforementioned second condition regarding the specifying voltage $V_{Ref}$:

$$V_{Ref} = (2 \cdot V_{cc2} \cdot I_m \cdot Rc)/(V_{cc2} + I_m \cdot Rc) \quad (7)$$

More specifically, in the case where the specifying voltage $V_{Ref}$ is applied to the specifying terminal 30, the resistance values Ra, Rb and Rc, specifying voltage $V_{Ref}$ and level-shift voltage $V_{cc2}$ are set so that the foregoing expressions (6) and (7) are satisfied. As the result of this setting manner, the range of the input voltage $V_{in}$ corresponds with the range of converted input voltage, whereupon the effective resolution can be most improved.

In each of the foregoing embodiments, the power supply line 11 in the inversion section 3 is connected to the ground line 25 so that the reference potential is given. However, the power supply line 11 in the DC power supply 2 may be connected to the ground line 25 so that the reference potential is given, instead.

Even in the case where the voltage $V_{cc1}$ is equal to or higher than the level shift voltage $V_{cc2}$, the effective resolution can be improved by applying suitable specifying voltage to the specifying terminals 30 and 31 according to the range of the input voltage $V_{in}$.

A discrete A/D converter may be used with due consideration of delay in communication, pattern noise and the like.

The load of the inverter device 1 or 34 should not be limited to the brushless motor. The load may be an induction motor or synchronous motor, instead. Furthermore, the load should not be limited to the motors.

The foregoing description and drawings of the present invention are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An inverter device comprising:
    a DC power supply;
    an inversion section connected via a DC power supply line to the DC power supply to be supplied with DC voltage from the DC power supply, thereby delivering AC voltage;
    a current-detecting resistor connected to the DC power supply line and having both ends; and
    a current detector detecting current on the basis of voltage developed across said both ends of the current-detecting resistor, the current detector including a voltage-dividing resistor connected between a level-shift power supply line having a predetermined level-shift voltage and one of the ends of the current-detecting resistor, the voltage-dividing resistor having a voltage-dividing point, the current detector further including an A/D converter having a pair of reference potential terminals and an input terminal, one of the reference potential terminals being connected to the other end of the current-detecting resistor, the input terminal being connected to the voltage-dividing point of the voltage-dividing resistor.

2. An inverter device according to claim 1, wherein a range of converted voltage supplied to the input terminal of the A/D converter is specified by a specifying voltage set to be lower than the level-shift voltage.

3. An inverter device according to claim 2, wherein the range of converted voltage of the A/D converter is set so as to be specified by the specifying voltage applied to the pair of reference potential terminals.

4. An inverter device according to claim 2, wherein the A/D converter includes an upper limit specifying terminal specifying an upper limit value of the range of converted voltage, and the specifying voltage applied to the upper limit specifying terminal is set to be lower than the level-shift voltage.

5. An inverter device according to claim 2, wherein the A/D converter includes a lower limit specifying terminal specifying a lower, limit value of the range of converted voltage, and the specifying voltage applied to the lower limit specifying terminal is set to be higher than a voltage at said one reference potential terminal.

6. An inverter device according to claim 4, wherein the A/D converter includes a lower limit specifying terminal specifying a lower limit value of the range of converted voltage, and the specifying voltage applied to the lower limit specifying terminal is set to be higher than a voltage at said one reference potential terminal.

7. An inverter device according to claim 4, wherein the voltage-dividing resistor includes a series circuit of a first resistor having a resistance value Ra and a second resistor having a resistance value Rb, and a ratio of the resistance value Ra to the resistance value Rb is set as:

$$Ra:Rb=V_{cc}:(I_m \cdot Rc)$$

where Rc is a resistance value of the current-detecting resistor, $\pm I_m$ is a maximum current value to be detected and $V_{cc}$ is said level-shift voltage, and a specifying voltage $V_{Ref}$ applied to the upper limit specifying terminal is set as:

$$V_{Ref}=(2 \cdot V_{cc} \cdot I_m \cdot Rc)/(V_{cc}+I_m \cdot Rc).$$

8. An inverter device according to claim 1, further comprising a processor controlling the inverting section, wherein the A/D converter is incorporated in the processor.

9. An inverter device comprising:

a DC power supply;

an inversion section connected via a DC power supply line to the DC, power supply to he supplied with DC voltage from the DC power supply, thereby delivering AC voltage, the inversion section having a plurality of switching elements;

a current-detecting resistor provided between the switching elements and the DC power supply line, the current-detecting resistor having both ends; and a current detector detecting current on the basis of voltage developed across said both ends of the current-detecting resistor, the current detector including a voltage-dividing resistor connected between a level-shift power supply line having a predetermined level-shift voltage and one of the ends of the current-detecting resistor, the voltage-dividing resistor having a voltage-dividing point, the current detector further including an A/D converter having a pair of reference potential terminals and an input terminal, one of the reference potential terminals being connected to the other end of the current-detecting resistor, the input terminal being connected to the voltage-dividing point of the voltage-dividing resistor.

10. An inverter device according to claim 9, wherein a range of converted voltage supplied to the input terminal of the A/D converter is specified by a specifying voltage set to be lower than the level-shift voltage.

11. An inverter device according to claim 10, wherein the range of converted voltage of the A/D converter is set so as to be specified by the specifying voltage applied to the pair of reference potential terminals.

12. An inverter device according to claim 10, wherein the A/D converter includes an upper limit specifying terminal specifying an upper limit value of the range of converted voltage, and the specifying voltage applied to the upper limit specifying terminal is set to be lower than the level-shift voltage.

13. An inverter device according to claim 10, wherein the A/D converter includes a lower limit specifying terminal specifying a lower limit value of the range of converted voltage, and the specifying voltage applied to the lower limit specifying terminal is set to be higher than voltage at said one reference potential terminal.

14. An inverter device according to claim 12, wherein the A/D converter includes a lower limit specifying terminal specifying a lower limit value of the range of converted voltage, and the specifying voltage applied to the lower limit specifying terminal is set to be higher than a voltage at said one reference potential terminal.

15. An inverter device according to claim 12, wherein the voltage-dividing resistor includes a series circuit of a first resistor having a resistance value Ra and a second resistor having a resistance value Rb, and a ratio of the resistance value Ra to the resistance value Rb is set as:

$$Ra:Rb=V_{cc}:(I_m \cdot Rc)$$

where Rc is a resistance value of the current-detecting resistor, $\pm I_m$ is a maximum current value to be detected and $V_{cc}$ is said level-shift voltage, and a specifying voltage $V_{Ref}$ applied to the upper limit specifying terminal is set as:

$$V_{Ref}=(2 \cdot V_{cc} \cdot I_m \cdot Rc)/(V_{cc}+I_m \cdot Rc).$$

16. An inverter device according to claim 9, further comprising a processor controlling the inversion section, wherein the A/D converter is incorporated in the processor.

* * * * *